United States Patent
Hüttner et al.

(10) Patent No.: US 7,740,365 B2
(45) Date of Patent: Jun. 22, 2010

(54) BACKLIGHTING ARRANGEMENT WITH SEMICONDUCTOR LIGHT SOURCES ARRANGED IN LIGHT GROUPS AND LIGHTING DEVICE

(75) Inventors: Josef Hüttner, Regensburg (DE); Hubert Ott, Bad Abbach (DE); Mario Wanninger, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 23 days.

(21) Appl. No.: 12/065,053

(22) PCT Filed: Sep. 4, 2006

(86) PCT No.: PCT/DE2006/001550

§ 371 (c)(1),
(2), (4) Date: Jun. 11, 2008

(87) PCT Pub. No.: WO2007/025538

PCT Pub. Date: Mar. 8, 2007

(65) Prior Publication Data

US 2008/0239718 A1 Oct. 2, 2008

(30) Foreign Application Priority Data

Sep. 3, 2005 (DE) ........................ 10 2005 042 066

(51) Int. Cl.
G09F 13/04 (2006.01)
(52) U.S. Cl. ..................... 362/97.3; 362/249.02; 349/69
(58) Field of Classification Search ................ 362/97.3, 362/249.02, 231, 555, 561, 97.1, 97.2, 97.4, 362/800; 349/61–71
See application file for complete search history.

(56) References Cited

U.S. PATENT DOCUMENTS

| 4,851,824 | A  | * | 7/1989  | Murata ........................ 345/83 |
| 6,100,952 | A  | * | 8/2000  | Marvin et al. ................. 349/62 |
| 6,478,447 | B2 |   | 11/2002 | Yen |
| 6,666,567 | B1 | * | 12/2003 | Feldman et al. ............. 362/237 |
| 7,304,697 | B2 | * | 12/2007 | You ............................. 349/69 |
| 2003/0178627 | A1 | | 9/2003 | Marchl et al. |
| 2004/0218388 | A1 | | 11/2004 | Suzuki |
| 2005/0001537 | A1 | | 1/2005 | West et al. |
| 2005/0014537 | A1 | | 1/2005 | Gammon et al. |

(Continued)

FOREIGN PATENT DOCUMENTS

DE 10051159 2/2002

(Continued)

OTHER PUBLICATIONS

The Notification of Transmittal of Copies of Translation of the International Preliminary Report on Patentability mailed on Apr. 17, 2008 in corresponding International Application No. PCT/DE2006/001550.

Primary Examiner—Gunyoung T Lee
(74) Attorney, Agent, or Firm—Fish & Richardson P.C.

(57) ABSTRACT

This invention relates to uniform backlighting of surfaces by semiconductor light sources. Various semiconductor light sources are combined into identical illumination groups. These identical illumination groups are arranged so that uniform backlighting of a surface is made possible. For homogeneous color mixing to be achieved, especially at edges, each illumination group in the arrangement has at least one adjacent illumination group in a different orientation.

20 Claims, 7 Drawing Sheets

U.S. PATENT DOCUMENTS

| | | |
|---|---|---|
| 2005/0052590 A1 | 3/2005 | Ochiai et al. |
| 2005/0076899 A1 | 4/2005 | Hibshman, II et al. |
| 2005/0169007 A1 | 8/2005 | Chou |
| 2006/0209538 A1* | 9/2006 | Chang et al. ............... 362/231 |
| 2006/0232696 A1 | 10/2006 | Bogner et al. |
| 2006/0232969 A1 | 10/2006 | Bogner et al. |
| 2008/0024696 A1 | 1/2008 | Trai et al. |

FOREIGN PATENT DOCUMENTS

| | | |
|---|---|---|
| JP | 8030213 | 2/1996 |
| JP | 11003051 | 6/1999 |
| WO | WO 2004/031844 | 4/2004 |
| WO | WO 2006/040937 | 4/2006 |
| WO | WO 2006/076899 | 7/2006 |
| WO | WO 2007/008048 | 1/2007 |

\* cited by examiner

//BACKLIGHTING ARRANGEMENT WITH SEMICONDUCTOR LIGHT SOURCES ARRANGED IN LIGHT GROUPS AND LIGHTING DEVICE

CROSS-REFERENCE TO RELATED APPLICATIONS

This application is the National Stage of International Application No. PCT/DE2006/001550, filed Sep. 4, 2006, which claims priority to German Patent Application No. 10 2005 042 066.4, filed Sep. 3, 2005, the contents of which are incorporated herein by reference.

FIELD OF INVENTION

This invention relates to a backlighting arrangement with semiconductor light sources arranged in illumination groups. The invention also relates to an illumination device that has such a backlighting arrangement.

BACKGROUND OF THE INVENTION

This Patent Application claims the priority of German Patent Application 102005042066.4-54, the disclosure content of which is incorporated herewith by back reference.

SUMMARY OF THE INVENTION

Cold cathode fluorescent tubes have been used primarily up to now for the backlighting of surfaces such as LCDs (Liquid Crystal Displays). These radiate mostly white light, but require considerable space and power.

The use of semiconductor light sources in the backlighting of LCD or TFT image screens has been gaining more and more importance in recent years. For this purpose, it is necessary for a surface to be uniformly backlighted by semiconductor light sources.

For uniform color rendition on the image screen to be illuminated, it is particularly necessary to achieve homogeneous color mixing of the light emitted by semiconductor light sources of various colors. First of all, the use of differently colored semiconductor light sources requires uniform color mixing of the individual emissions of the semiconductor light sources. This homogeneous color mixing can be achieved by a large separation of the individual light sources from the surface to be backlighted. In addition, diffusely scattering materials can be applied between the surface to be backlighted and the light sources.

The increased separation, of course, causes undesirably large structural dimensions. Diffusers between the light sources and the surfaces to be backlighted typically lead to considerable losses of illuminating power. This impairs the overall efficiency of such backlighting and its feasibility. Overall efficiency of the backlighting here means the illuminating power relative to the energy consumed.

WO 2004/031844 A1 provides an example of backlighting with semiconductor light sources. A plurality of semiconductor light sources of different colors are assembled there into subassemblies, and these illumination groups are arranged in a rectangular grid with identical orientations. It may be difficult to produce a homogeneous mixed color by using such a light source arrangement. Because of the identical orientation of the subassemblies, there is a tendency for regions within the backlighted surface, and especially at the edge, to show severe color deviations.

The color mixture of a subassembly of semiconductor light sources, for one thing, is affected by the fact that the individual semiconductor light sources have different preferential directions in their emitted radiation. Similar behavior also occurs when multichip packages, i.e. LED units that contain a plurality of semiconductor chips of different colors, are used instead of subassemblies with semiconductor light sources of different colors.

FIG. 5 shows details of a backlighting arrangement 1. The dashed line is intended to represent the edge 3 of the backlighting arrangement 1. There are four illumination groups there, at one of the illustrated edges. The individual illumination groups are of identical construction. In particular, they contain three semiconductor chips with different emission spectra. The semiconductor chips of each illumination group are arranged in the same way. This example involves a multichip package such as that sold by the Osram company under the name Multitopled. Illumination groups pursuant to the invention are of course not limited to such multichip packages, but include all types of arrangements of radiation-emitting semiconductor structural members.

In such backlighting arrangements, identical illumination groups, or illumination groups of the same kind, are arranged on strip-shaped boards in identical orientation. Planar backlighting units are than assembled on the strip-shaped boards.

Each of the illumination groups of the same kind is arranged in the same orientation in a rectangular grid arrangement. In this case, each illumination group contains a radiation-emitting semiconductor structural member with three radiation-emitting semiconductor chips. In this example of embodiment, in each case these are a blue-emitting (B), a green-emitting (G), and a red-emitting (R) semiconductor chip 32a, 32b, and 32c, respectively. Since adjacent illumination groups 31a, 31b in each case have the same orientation and the individual semiconductor light sources of each illumination group have preferential directions of radiation, there is only conditionally homogeneous color mixing of the individual spectral contributions of the semiconductor light sources.

According to the Figure, adjacent illumination groups 31a and 31b have the same orientation. In this example of embodiment, only red-emitting semiconductor members 2c, 2d, and 2e are adjacent on the edge along the vertical dashed line. Because of this, there can be inhomogeneous color effects at the edge of such backlighting units.

The objective underlying this invention is to bring about an improvement of color mixing in a backlighting arrangement or an illumination device in an economical manner.

This objective is reached by a backlighting arrangement or an illumination device pursuant to Patent Claim 1 or Patent Claim 18.

A backlighting arrangement or a backlighting module pursuant to the invention comprises a plurality of illuminating groups of the same kind, wherein each illuminating group has at least one adjacent illumination group with a different orientation.

Different semiconductor light sources are assembled into illumination groups of the same kind. For example, these can be RGB light sources. The illumination groups can of course also contain various other colors. These illumination groups of the same kind are arranged so that a surface is backlighted uniformly. Each of the illumination groups is preferably of the same kind. In other words, each illumination group contains the same semiconductor light sources in the same arrangement. So that edge effects of inhomogeneous color mixing can be avoided, each illumination group with the same arrangement has at least one adjacent illumination group in a different orientation.

Two illumination groups of a backlighting arrangement are adjacent if an imaginary path between the centers of the two illumination groups neither contacts nor intersects the envelope of any third illumination group of the backlighting arrangement.

There is a different orientation of an illumination group relative to another illumination group, for example, when the distance between the centers of the identical semiconductor light sources of adjacent illumination groups is different from the distance between the centers of the adjacent illumination groups. For example, a different orientation can be realized if the adjacent illumination groups are rotated with respect to one another regarding their principal direction of radiation.

Each illumination group of a backlighting arrangement pursuant to the invention has a plurality of semiconductor light sources in the same arrangement. This forms the backlighting arrangement from an arrangement of illumination groups of the same kind. Semiconductor light sources, for example, can be semiconductor chips, organic luminescent polymers, individual LEDs, or OLEDs.

Illumination groups can also be made by assembling a plurality of LEDs into a common illumination group.

According to a preferred embodiment, at least two of the semiconductor light sources provide different colors or different color contributions.

According to another preferred embodiment, each illumination group has at least one red light-emitting semiconductor light source, at least one green light-emitting semiconductor light source, and at least one blue light-emitting semiconductor light source.

In the case of semiconductor chips that serve as semiconductor light sources, the illumination groups can be individual radiation-emitting semiconductor components, wherein each semiconductor component has a plurality of semiconductor chips. In particular, the illumination groups can be so-called "multichip LED packages." These are LED components that comprise a plurality of semiconductor chips. These semiconductor chips can have different emission spectra, for example red (R), green (G), and blue (B). Such multichip packages are sold, for example, by the OSRAM company under the trade name 6-Lead Multitopleds. By way of example, they have three semiconductor chips, each with a red, a green, and a blue emission spectrum, and six electrical contacts.

Another embodiment provides that the illumination groups are arranged in a regular grid arrangement. A regular grid arrangement in this case brings about homogeneous lighting of the entire surface.

For homogeneous backlighting, another advantageous embodiment of the invention provides that the regular grid arrangement contains planar grid structure types of a group that in turn includes hexagon, rhombus, rectangle, or parallelogram. The individual illumination groups then are each seated on the corners of the corresponding grid structure types.

According to a particular variant, the illumination groups are arranged on at least one carrier. The entire backlighting arrangement can also be arranged on one common carrier. However, it is also possible for each individual illumination group, or a plurality of them, to be arranged on separate carriers.

According to another advantageous embodiment, the carrier is of strip-shaped design. Individual or multiple illumination groups can thus be arranged on strip-shaped carriers. The backlighting arrangement can then be formed by arranging a plurality of these strip-shaped carriers next to one another. Each two adjacent strips of identical structure in this case, for example, can be rotated by 180° from one another with regard to the principal direction of radiation of their illumination groups. The adjacent strips are thereby oriented antiparallel to one another.

Another advantageous embodiment provides that each two adjacent illumination groups are rotated by a given angle, particularly by 90° with respect to one another, relative to an imaginary axis along their principal directions of radiation. If this embodiment, in addition, is arranged in a rectangular grid, it can be achieved that each illumination group of the backlighting arrangement has two adjacent illumination groups oriented differently, in each case within their own rows and columns. This reduces edge effects of inhomogeneous color mixing.

Another advantageous embodiment provides that two adjacent illumination groups in each case are rotated with respect to one another by 180° relative to an imaginary axis along their principal direction of radiation. This embodiment allows simple assembly of the backlighting arrangement, with improved color mixing at the same time.

Another advantageous embodiment of the backlighting arrangement provides that illumination groups are placed next to one another in rows in the same orientation on a strip-shaped carrier, and the illumination groups are lined up next to one another during construction of the backlighting arrangement, with two identical adjacent illumination group strips being antiparallel to one another in each case.

Another advantageous embodiment provides that the illumination groups are arranged on a carrier consisting of a printed circuit board. All popular printed circuit boards are feasible here, but especially including metal-core boards, which have good thermal conductivity.

Another advantageous embodiment of the backlighting arrangement provides that the semiconductor light sources of the backlighting arrangement, which have the same emission spectrum, are controllable separately. In this way, color tint effects in the image can be produced, particularly when using the backlighting arrangement in combination with a flat picture screen.

Another advantageous embodiment of the backlighting arrangement provides that the semiconductor light sources of the particular illumination groups are individually controllable. In this way, if individual semiconductor light sources fail, undesirable inhomogeneous color effects can be reduced or avoided by suitable electronic readjustment.

An illumination device has a backlighting arrangement as described above and an optical element. Optimized color homogeneity can beneficially be produced with the illumination device pursuant to the invention.

It is expedient for the optical element to be arranged relative to the backlighting arranged so that light emitted by the backlighting arrangement passes through the optical element.

According to a preferred variant, the illumination device is a display device. In this case it is especially preferred for the optical element to have properties that provide information. In particular, the optical element can be an LCD (Liquid Crystal Display).

According to an alternative variant, the illumination device is a lighting device. In this case, the optical element can have light-mixing or light-aligning properties.

A diffuser, for example, is especially suitable as an optical element with light-mixing properties. The diffuser is primarily characterized by the fact that it has at least one surface for the passage of light that scatters diffusely, which may be roughened, or a diffusely scattering volume area with added scattering particles, for example.

A BE (Brightness Enhancement) film, particularly a prismatic film, can also be used as an optical element with light-aligning properties. A BE film, for example, can have prismatic structures arranged linearly. These cause light coupled into the film from a bottom face to be partially reflected. The transmitted portion is restricted to a relatively small flare angle. The BE film essentially represents a filter that transmits light in a narrow angle around the principal direction of radiation, and reflects the rest of the radiation.

DESCRIPTION OF THE DRAWINGS

Other benefits, preferred forms of embodiment, and refinements of the invention are described below in combination with the examples of embodiment explained in FIGS. 1 to 5. The figures show.

In the examples of embodiment and the figures, identical elements or elements with identical action are given the same reference symbols.

DETAILED DESCRIPTION OF THE PREFERRED EMBODIMENTS

The illustrations of the backlighting arrangements in the figures are of schematic nature. The elements in the figures therefore do not correspond to reality, but are shown symbolically to be able to make the functioning of the arrangements more understandable.

Figure 1:
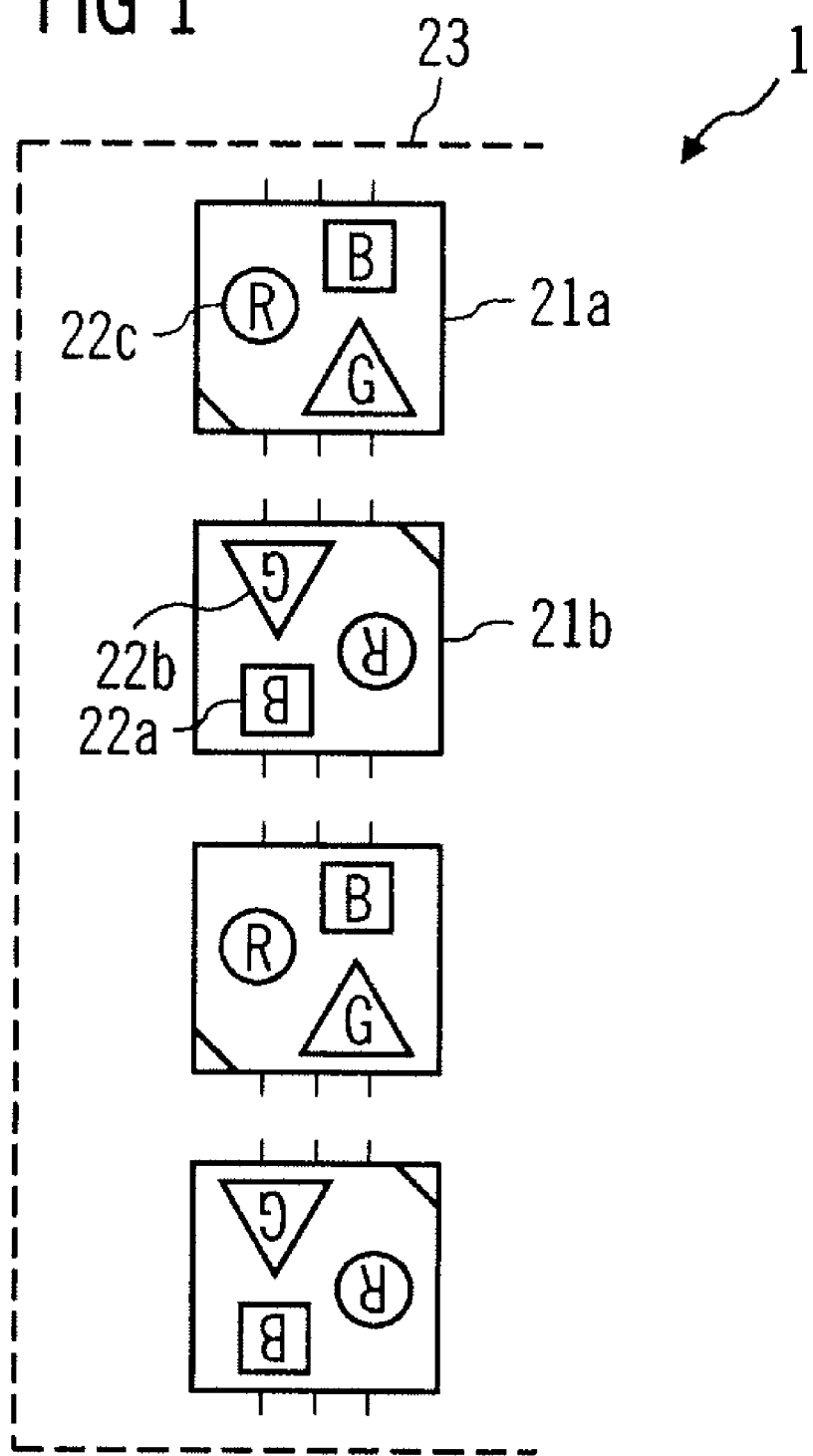
FIG. 1 a schematic representation of a first backlighting arrangement pursuant to the invention, FIG. 2 an embodiment of a second backlighting arrangement pursuant to the invention, FIG. 3 another embodiment of a third backlighting arrangement pursuant to the invention, FIG. 4 another embodiment of a fourth backlighting arrangement pursuant to the invention, FIG. 5 schematic representations of a backlighting arrangement already described for backlighting a surface, FIG. 6 a schematic cross-sectional view of a first embodiment of an illumination device pursuant to the invention, FIG. 7 a schematic cross-sectional view of a second embodiment of an illumination device pursuant to the invention.

In the backlighting arrangement 1 of FIG. 1, little or no interfering color edge occurs. A red-emitting semiconductor component 22c, a green-emitting semiconductor component 22b, and a blue-emitting semiconductor component 22a alternately face the dashed line of the edge 23. This alternating color sequence comes into existence because each two adjacent illumination groups of the same construction 21a, 21b, each having a red-emitting semiconductor component 22c, a green-emitting semiconductor component 22b, and a blue-emitting semiconductor component 22a, are arranged turned by 180° with respect to one another relative to their principal directions of radiation.

Figure 2:
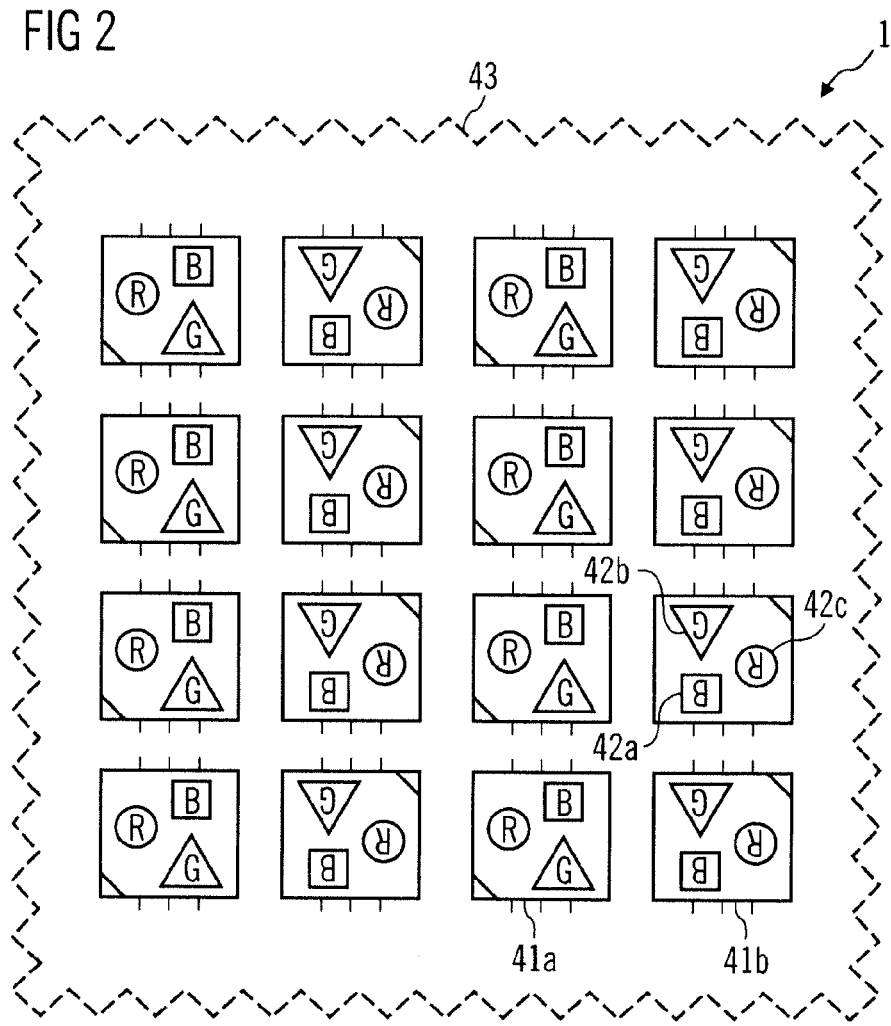

FIG. 2 shows a schematic representation of a second advantageous embodiment of the invention. In this special form of embodiment, each illumination group contains a radiation-emitting semiconductor component with three radiation-emitting semiconductor light sources. In this embodiment, these are a blue-emitting semiconductor chip 42a, a green-emitting one 42b, and a red-emitting one 42c. The illuminations groups are arranged so that the illumination groups in a column of the rectangular grid arrangement all have the same orientation. However, the illumination groups 41a, 41b of adjacent columns are all turned by 180° relative to an imaginary axis parallel to the principal direction of radiation compared to those of the adjacent column. In other words, every other column of illumination groups is arranged antiparallel to its adjacent column. This improves the color homogeneity over the entire surface. Illumination groups pursuant to the invention are not limited, of course, to such multichip packages, but comprise all types of arrangements of radiation-emitting semiconductor components.

The edge 43 of the backlighting arrangement 1 shown with dashed zig-zag lines means that embodiments pursuant to the invention are not limited to a number of sixteen illumination groups, but can be expanded by more illumination groups in any directions, depending on the application. Similarly to FIG. 1, an alternating color sequence of semiconductor light sources occurs at the horizontal edges of the backlighting arrangement 1.

Figure 3:
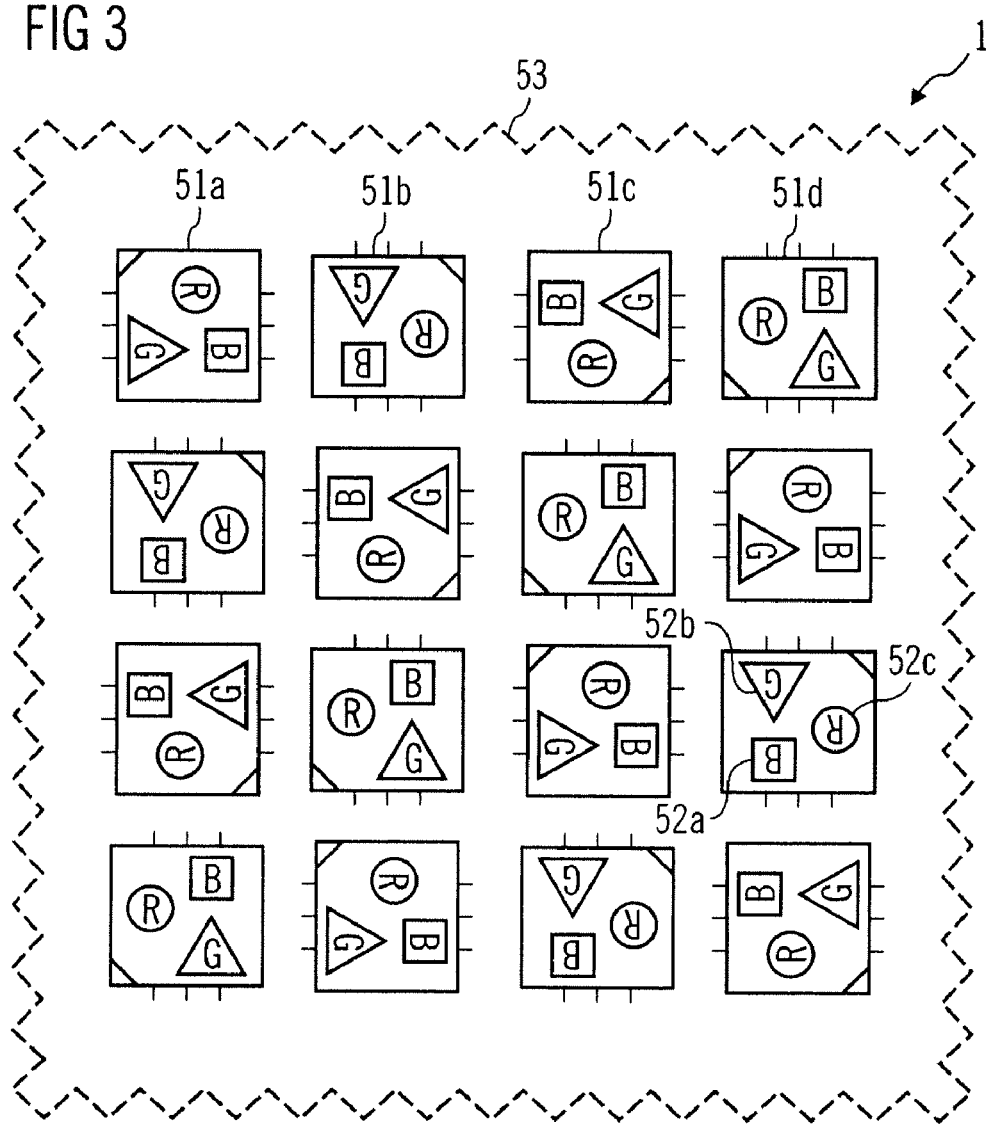

FIG. 3 shows a third backlighting arrangement 1. In this special embodiment, each illumination group contains a radiation-emitting semiconductor component with three radiation-emitting semiconductor chips. In this example of embodiment, they are a blue-emitting, a green-emitting, and a red-emitting semiconductor chip 52a, 52b, and 52c, respectively. Adjacent illumination groups are turned by 90° from each other. In other words, four successive illumination groups 51a, 51b, 51c, 51d of a column and/or of a row do not have the same orientation. This can minimize color inhomogeneities both at the edge 53 of the backlighting arrangement 1 and over the entire surface of the backlighting arrangement 1.

However, embodiments are not reduced only to the angles of 180° or 90° already mentioned. Variations in the arrangement can optionally assume any rotational angle relative to the direction of radiation of the illumination groups. However, a uniform variation of the rotational angle of successive illumination groups is preferred. In the arrangement shown in FIG. 3, each illumination group has a maximum of two adjacent illumination groups that have the same orientation.

The dashed zig-zag edge shown of the backlighting arrangement 1 makes it clear that the embodiment is not limited to a number of sixteen illumination groups, but can be expanded in any directions by additional illumination groups, depending on the application. Similarly to FIG. 1, an alternating color sequence of semiconductor light sources occurs at the horizontal and vertical edges 53 of the backlighting arrangement 1. For this and for all other embodiments, the illumination groups used are not limited to multichip packages. In particular, illumination groups can also have the form of a combination of a plurality of individual semiconductor light sources, for example such as LEDs. The illumination groups are also not limited just to the arrangement of semiconductor light sources in groups of three, but they can contain any number of semiconductor light sources. The emission spectra of illumination groups pursuant to the invention are also not limited exclusively to the colors red, green, and blue, but can instead comprise all colors.

Figure 4:
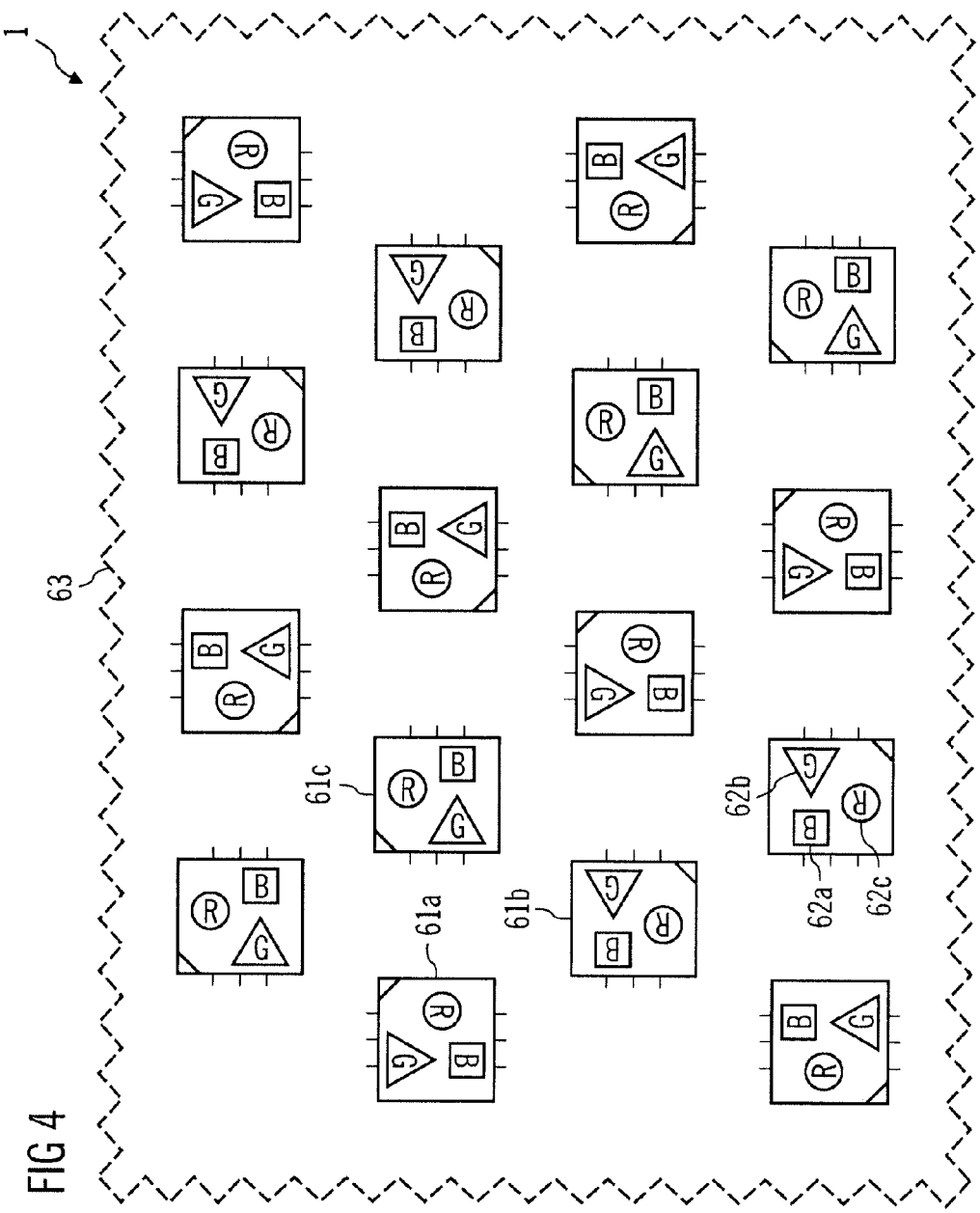
Figure 5:
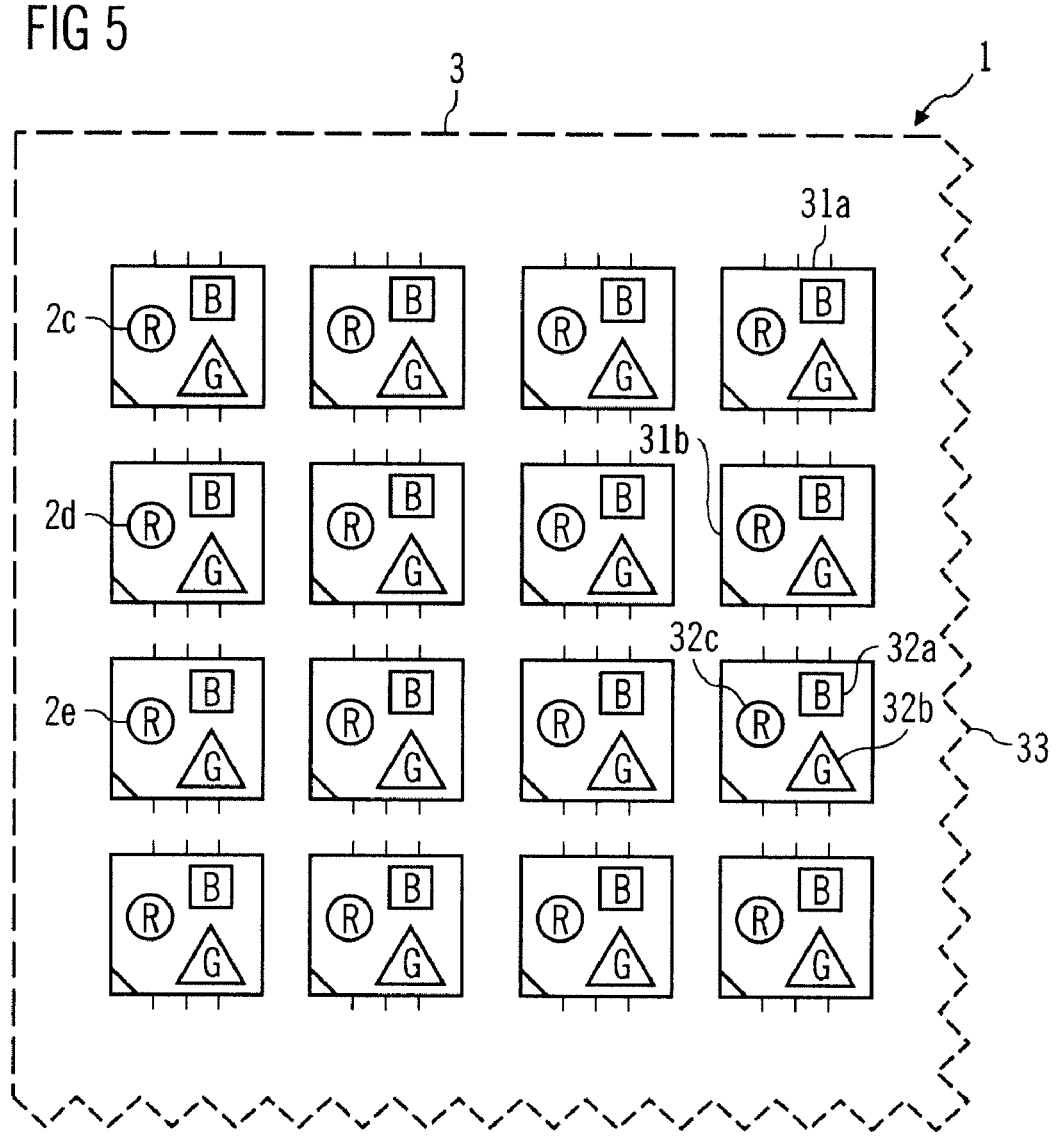

Another advantageous embodiment is shown in FIG. 4. In this case, the orientation of the illumination groups corresponds essentially to that shown in FIG. 3. In each case, a blue-emitting, a green-emitting, and a red-emitting semiconductor chip 62a, 62b, and 62c are combined in a multichip package to make up an illumination group 61a, 61b, 61c. The backlighting arrangements 1 of FIGS. 3 and 4 differ principally in that two adjacent columns of the backlighting arrangement 1 are displaced vertically from one another in each case. This creates a backlighting arrangement 1 with an arrangement of illumination groups in a type of hexagonal grid. This makes it possible to achieve a larger illumination density, with color homogeneity improved over similar backlighting arrangements at the same time.

The discussions corresponding to those for FIG. 3 apply appropriately to the zig-zag dashed edge 63 of the backlighting arrangement 1 of FIG. 4.

However, backlighting arrangements pursuant to the invention are not limited just to hexagonal or rectangular grids; they can also comprise rhombic or parallelogram grid structures. Illumination groups arranged in a grid structure mean principally arrangements in which the illumination groups lie on the grid points of a regular grid.

In another embodiment, the semiconductor light sources and/or the individual illumination group arrangements can be controlled separately by means of a control. For example, the contrast in given image areas can be increased by adjusting the light intensity with such a control. The tint of the emission of the backlighting arrangement can also be varied by varying the light intensity of the individual semiconductor light sources with the same emission spectrum. If individual light sources or illumination groups fail, the change of emission brought about by the failure can be corrected.

Figure 6:
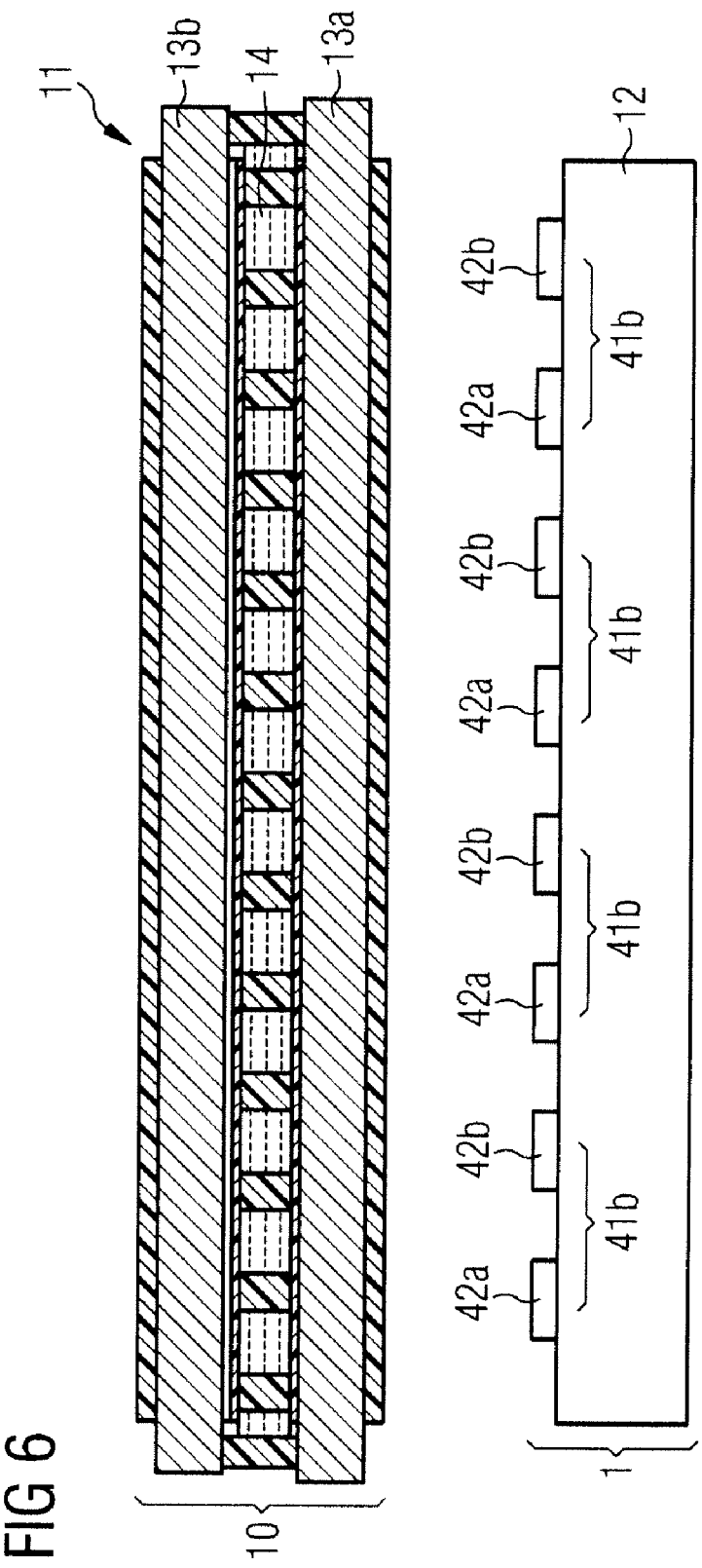

The illumination device 11 shown in FIG. 6, for example, has a backlighting arrangement 1 like that described in connection with FIG. 2, and an optical element 10.

The backlighting arrangement 1 comprises a plurality of semiconductor light sources 42a and 42b that are arranged on a carrier 12. The carrier 12, for example, can be a printed circuit board. A blue semiconductor light source 42a and a green semiconductor light source 42b are components of an illumination group 41b.

The illumination groups 41b are arranged on the carrier 12 so that the emitted light passes through the optical element 10.

In the case illustrated, the illumination device 11 is a display device, wherein the optical element 10, which is an LCD, has the property of providing information.

There is a liquid crystal 14 between a first substrate 13a and a second substrate 13b, with an electrical field being applied to the liquid crystal 14 to display information.

Figure 7:
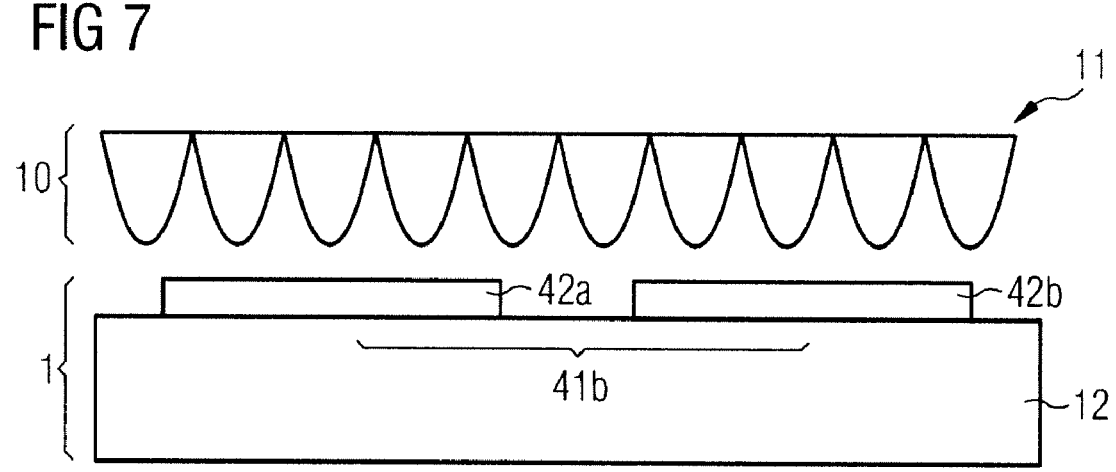

FIG. 7 shows an illumination device 11 with a backlighting arrangement 1 and an optical element 10, with the illumination device 11 serving as a lighting device. The optical element 10 can have light-mixing or light-aligning properties. The optical element 10 is preferably a BE (Brightness Enhancement) film with a suitable structure, for example a prismatic array or an array of inverse CPCs (Compound Parabolic Concentrators).

The invention is not limited by the description with reference to the examples of embodiment. Instead, the invention comprises any new feature and any combination of features, which includes in particular any combination of features in the Patent Claims, even if this feature or this combination itself is not specified explicitly in the Patent Claims or examples of embodiment.

The invention claimed is:

1. A backlighting arrangement comprising:
   a plurality of identical illumination groups, in which
      each illumination group has at least one adjacent illumination group with a different orientation,
      each illumination group is a radiation-emitting semiconductor component that has a plurality of semiconductor chips,
      at least two of the semiconductor chips provide different colors or color contributions,
      each illumination group has at least one red light-emitting semiconductor chip, at least one green light-emitting semiconductor chip, and at least one blue light-emitting semiconductor chip,
      at least two adjacent illumination groups in each case are rotated relative to one another by 90 or 180 degrees with respect to an imaginary axis along their principal direction of radiation,
      a plurality of illumination groups are attached to a first strip-shaped carrier and other illumination groups are attached to a second strip-shaped carrier adjacent to the first carrier, with the first and second carriers being arranged antiparallel to one another.

2. Backlighting arrangement pursuant to claim 1, characterized by the fact that each illumination group has a plurality of semiconductor chips in identical arrangement.

3. Backlighting arrangement pursuant to claim 2, characterized by the fact that the semiconductor chips are light emitting diodes.

4. Backlighting arrangement pursuant to claim 2, characterized by the fact that the semiconductor chips of different colors or color contributions separately controllable.

5. Backlighting arrangement pursuant to claim 1, characterized by the fact that the semiconductor chips are individually controllable.

6. Backlighting arrangement pursuant to claim 1, characterized by the fact that the illumination groups are arranged in a regular grid arrangement.

7. Backlighting arrangement pursuant to claim 6, characterized by the fact that the grid arrangement contains a grid structure that in turn contains a hexagon, rhombus, rectangle, or parallelogram.

8. Backlighting arrangement pursuant to claim 1, characterized by the fact that the illumination groups of the first strip-shaped carrier are attached to said carrier in the same orientation.

9. Backlighting arrangement pursuant to claim 1, characterized by the fact that the carrier is a printed circuit board.

10. Illumination device that has a backlighting arrangement pursuant to claim 1 and that has an optical element.

11. Illumination device pursuant to claim 10, wherein the light emitted by the backlighting arrangement passes through the optical element.

12. Illumination device pursuant to claim 10, wherein the illumination device is a display device.

13. Illumination device pursuant to claim 12, wherein the optical element has the property of providing information.

14. Illumination device pursuant to claim 12, wherein the optical element is a liquid crystal display.

15. Illumination device pursuant to claim 10, wherein the illumination device is a lighting device.

16. Illumination device pursuant to claim 15, wherein the optical element has light-mixing properties.

17. Illumination device pursuant to claim 16, wherein the optical element is a diffuser.

18. Illumination device pursuant to claim 15, wherein the optical element has light-aligning properties.

19. Illumination device pursuant to claim 18, wherein the optical element is a BE (Brightness Enhancement) film.

20. Illumination device pursuant to claim 19, wherein the BE (Brightness Enhancement) film is a prismatic film.

* * * * *